(12) United States Patent
Kjelgaard et al.

(10) Patent No.: US 8,298,635 B2
(45) Date of Patent: Oct. 30, 2012

(54) METHOD OF PRODUCING A BLANK OF PACKAGING LAMINATE AS WELL AS A THUS PRODUCED BLANK AND A PACKAGING CONTAINER

(75) Inventors: Tom Kjelgaard, Lund (SE); Bengt Andersson, Malmo (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1120 days.

(21) Appl. No.: 11/667,293

(22) PCT Filed: Oct. 14, 2005

(86) PCT No.: PCT/SE2005/001531
§ 371 (c)(1),
(2), (4) Date: May 8, 2007

(87) PCT Pub. No.: WO2006/052179
PCT Pub. Date: May 18, 2006

(65) Prior Publication Data
US 2007/0286972 A1    Dec. 13, 2007

(30) Foreign Application Priority Data
Nov. 9, 2004    (SE) ........................ 0402752

(51) Int. Cl.
  *B32B 1/02*    (2006.01)
  *B32B 23/00*    (2006.01)
(52) U.S. Cl. ............... 428/35.2; 428/34.1; 428/34.2; 428/34.4; 428/35.7; 428/35.9
(58) Field of Classification Search ............ 428/34.1, 428/35.7, 35.9, 36.9, 34.2, 34.4, 35.2
See application file for complete search history.

(56) References Cited

U.S. PATENT DOCUMENTS
3,528,867 A    9/1970    Leatherman, et al.
(Continued)

FOREIGN PATENT DOCUMENTS
EP    0353100 A2    1/1990
(Continued)

OTHER PUBLICATIONS
International Search Report for PCT/SE2005/001531 dated Jan. 20, 2006.
(Continued)

Primary Examiner — Marc Patterson
(74) Attorney, Agent, or Firm — Buchanan Ingersoll & Rooney PC (57) ABSTRACT

The disclosure relates to a method of producing a blank (50a, 50b) of thermosealable and creased packaging laminate for a microwave-friendly packaging container, comprising the steps of: (a) advancing a continuous web (1) of a base laminate (10) in a conversion line for the packaging laminate so that continuous blanks for said packaging containers are oriented with their top-to-bottom direction transversely of the machine direction of the conversion line and with a top-to-bottom interface (51), (b) providing said base laminate (10) with creases and cutting into said blanks (50a, 50b) of the packaging laminate, a continuous strip (2) of a material which conducts heat and electricity being applied in the machine direction in a region over said top-to-top/bottom interface (51) and in conjunction with step (a), and an elongate opening indication (53) being provided, before or after the application of the strip (2) so that the opening indication is positioned within the region of said strip. The disclosure also relates to a thus produced blank, as well as a packaging container which is formed using such a blank as the point of departure.

20 Claims, 4 Drawing Sheets

U.S. PATENT DOCUMENTS

| | | | | |
|---|---|---|---|---|
| 4,702,407 | A | * | 10/1987 | Lisiecki ..................... 229/223 |
| 4,789,066 | A | * | 12/1988 | Lisiecki ................... 229/123.2 |
| 4,872,562 | A | * | 10/1989 | Wyberg ....................... 206/523 |
| 5,452,849 | A | * | 9/1995 | Schramer et al. ............ 229/206 |
| 5,622,780 | A | | 4/1997 | Paleari |
| 5,810,961 | A | * | 9/1998 | Andersen et al. ............ 156/324 |
| 2006/0105124 | A1 | | 5/2006 | Kikuchi |
| 2006/0198975 | A1 | | 9/2006 | Kikuchi |

FOREIGN PATENT DOCUMENTS

| | | |
|---|---|---|
| EP | 0 378 880 A1 | 7/1990 |
| JP | 2004-017449 A | 1/2004 |
| WO | 97/02140 A1 | 1/1997 |
| WO | 98/16431 A1 | 4/1998 |

OTHER PUBLICATIONS

Database WPI Week 200427, Thomson Scientific, London, GB; AN 2004-286679, XP002548066.

Supplementary European Search Report dated Sep. 30, 2009 in corresponding European Application No. 05792377.

\* cited by examiner

METHOD OF PRODUCING A BLANK OF PACKAGING LAMINATE AS WELL AS A THUS PRODUCED BLANK AND A PACKAGING CONTAINER

TECHNICAL FIELD

The present invention relates to a method of producing a blank of thermosealable and creased packaging laminate for a microwave-friendly packaging container, comprising the steps of:
(a) continuously advancing a web of a base laminate in a conversion line for the packaging laminate so that continuous blanks for said packaging containers are oriented with their top-bottom direction transversely of the machine direction of the conversion line and with a top-to-top/bottom interface,
(b) providing said base laminate with creases and cutting to said blanks of packaging laminate.

The present invention also relates to a thus produced blank, as well as to a packaging container which, departing from such a blank, is formed, filled with contents, sealed and preferably retorted or alternatively hot filled.

BACKGROUND ART

A packaging laminate is previously known from, for example, international Patent Application carrying Publication Number WO97/02140. The prior art packaging laminate displays a rigid, but foldable core or bulk layer of paper or paperboard and outer, liquid-tight coatings of moisture- and heat resistant thermoplastic material on both sides of the core layer. In order to impart to the prior art packaging laminate tightness properties also against gases, in particular oxygen gas, the packaging laminate moreover displays a gas barrier, e.g. an aluminium foil, disposed between the core layer and the one outer coating.

From, for example, a flat-folded tubular packaging blank, retortable packaging containers are produced in that the packaging blank is first raised to an open, tubular packaging carton which is sealed at its one end by fold forming and sealing of the continuous, foldable end panels of the packaging carton for the formation of a substantially planar bottom seal. The packaging carton provided with the bottom is filled with the relevant contents, for example a food, through its open end, which is thereafter sealed by an additional fold-forming and sealing of the corresponding end panels of the packaging carton for the formation of a substantially planar top seal. Naturally, the top seal of the packaging carton may instead be formed first, in which event filling is instead put into effect via the bottom. The filled and sealed, normally parallelepipedic, packaging container is thereafter ready for a heat treatment in order to impart to the packed food extended shelf-life in the unopened packaging container, for example a shelf-life of at least 6 months, often even longer, for instance at least 12 or 18 months.

A heat treatment of the packed food with the intention of extending its shelf-life may suitably be put into effect by the method and under the conditions described in greater detail in international Patent Application carrying Publication Number WO98/16431, which is hereby incorporated as reference. The packaging container is placed in a retort and heated therein with the aid of a first circulating gaseous medium, for example hot steam, to a temperature which in general lies within the range of between 70 and 130° C. After a predetermined stay-time at the selected temperature, the supply of the first gaseous medium is discontinued. Thereafter, the packaging container is cooled by means of a second circulating gaseous medium, for example cold air, and finally by means of a circulating liquid medium, for example cold water. The cooled packaging container is thereafter removed from the retort for further transport and handling.

One variation of such retorting is so-called hot fill which is particularly employed for acidic products. In such instance, a sterile filling of the product takes place at at least 80° C. but below 100° C., whereafter no retorting is required.

Since, for example, soups, sauces and other ready-to-consume dishes may be packed in such a packaging container, there is a manifest need in the art for the contents to be able to be heated in a microwave oven when it is still in the opened packaging container. The problem in being able to achieve this is naturally that a gas barrier layer of aluminium jams the microwave radiation, for which reason a packaging container with such a gas barrier layer cannot be used in a microwave oven. Granted, it is known in the art that other gas barrier layers may be employed, such as polymer-based layers, which satisfy the general requirements placed on barrier properties. However, a major drawback in such polymer-based gas barrier layers is that they do not permit thermosealing by induction, which is afforded by gas barrier layers of aluminium or other electrically conductive materials. Induction thermosealing is a well tested and well functioning method which gives extremely tight seals. The superior adhesion which is attained in such seals moreover makes for an extremely good openability for an opening indication in the form of, for example, a perforation for tearing, in other words without the need of scissors. Further, the aluminium layer is almost a necessity if such perforations are to be able to be realised using laser perforation methods on the finished laminate and only partly through its thickness, in which event the laser perforation beam is arrested by the aluminium layer so that this layer and the layer or layers lying inside the aluminium layer are not perforated.

To sum up, it would thus be desirable to still be able to employ aluminium which, hence, is a need which runs contrary to the need for a microwave-friendly packaging material. Moreover, it is desirable from the viewpoint of the environment to be able to reduce the employment of aluminium in packaging materials.

It is previously known from EP 0 378 880 B1 to provide a paper-based packaging laminate with strips of aluminium whose purpose is to permit thermosealing by means of induction in the regions thereof. However, the publication is silent as to whether the quantity of aluminium would be sufficiently slight for the laminate to be microwave-friendly or whether the laminate can give a packaging container which permits retorting or hot fill. Nor is there any disclosure made concerning any opening arrangement or indication on the packaging laminate or packaging containers produced therefrom. Further, the method which is described for applying the aluminium strips on the laminate suffers from many drawbacks. The reason for this is that it is an intermittent method in which short strips are applied across the width of the laminate web with uniform spacing which corresponds to the positions where transverse seals are later made in the same line, in a continuous forming-filling-sealing process on the basis of the laminate which is continuously formed into a tube, filled with the intended contents, transversely sealed through the contents and thereafter cut into cushion-like containers which are subsequently fold-formed into, for example, brick shape. That this is a matter of an intermittent method in itself affords disadvantages as regards, for example, equipment, adjustment and operation. Further, even if the aluminium strip is, as stated, covered by polyethylene on both sides, the edge of the strip will expose the aluminium to the product which is to be stored in the packaging container and this is not acceptable for food products.

BRIEF OUTLINE OF THE INVENTION

One object of the present invention is therefore to obviate the above-discussed drawbacks and to be able to provide a method of producing a blank from packaging laminate of the type described by way of introduction for a packaging container which may be heated with its contents in a microwave oven and which may preferably be heat treated in a retort in connection with its filling or be hot filled.

A further object of the present invention is to offer a method of producing such a blank from packaging laminate which, thanks to a material which conducts heat and electricity, such as aluminium, may be transversely sealed in an extremely strong, tight and durable manner. Moreover, the blank of packaging laminate is to be provided with an opening indication in the form of, for example, a perforation in the region where the blank is to be top-sealed, this opening indication affording superior openability for the packaging container which is formed from the blank.

Yet a further object of the present invention is to provide such a blank of packaging laminate and a packaging container produced therefrom which permits heating in a microwave oven and preferably also retorting or hot fill and which displays extremely strong, durable and tight transverse seals and an opening indication displaying superior openability.

These and other objects and advantages will be attained according to the present invention as this is disclosed and defined in the appended claims.

Thus, there is proposed according to the present invention a method as described by way of introduction of producing a blank from thermosealable and creased packaging laminate for a microwave-friendly packaging container, a continuous strip of a material which conducts heat and electricity being applied in the machine direction, in an area over said top-to-top/bottom interface and in connection with step (a), and in which an elongate opening indication is provided, before or after the application of the strip, so that the opening indication is positioned in the region of said strip.

The term "microwave-friendly" is taken to signify that the packaging container, once it has been opened, may be heated with its contents in a microwave oven without problems occurring as a result of screening-off or jamming of the microwave radiation or as a result of sparking.

The fact that the strip may be provided continuously on the advancing web of base laminate entails a major advantage in terms of processing. This is possible thanks to the orientation of the blanks which, in step (a) are thus still continuous to one another and lie "transversely" across the web so that the top of a blank meets the top or bottom of another blank in what is designated here a "top-to-top/bottom interface". Preferably, the blanks are disposed so that they meet top-to-top in a "top-to-top interface". This also implies that the strip may have double width, in which event it is cut to the intended width in connection with the laminate being cut into blanks in step (b). The top of the blank provided with the strip of material which conducts heat and electricity will subsequently, in connection with filling and sealing, be sealed by means of induction to form a top-transverse seal which is strong, durable and tight.

Further, thanks to the elongate opening arrangement or indication in the region of the strip at the top end of the blank, this opening arrangement also being facilitated in production and obtaining superior properties thanks to the strip, a large part, preferably the major part, of the strip and thereby the metal material will be removed from the packaging container when this is opened in order then to be placed in a microwave oven. As a result, such a slight amount of metal material remains in the packaging container that heating in a microwave oven is not prevented by screening-off or jamming of the microwave radiation, but so much metal material is left that sparking does not occur.

According to one aspect of the present invention, said strip is formed from a metal foil; preferably an aluminium foil, and preferably displays a thickness of between 6 and 20 μm. Suitably, it is reinforced at least on its one side and preferably on both sides by a polymer reinforcing material, preferably polypropylene, polyamide or polyethylene terephthalate, suitably however with an adhesive plastic between the metal foil and the polymer reinforcing material. The strip may, for example, display a width of between 20 and 50 mm, it being applied so that also a top fin crease which is provided in step (b) is positioned within the region of said strip, as will be described and explained in greater detail in connection with the description of the accompanying Drawings. It will in such instance be perceived that the width of the strip will depend upon the size of the packaging container which is to be formed from the blank. Such a packaging size may be anything from, for example, 100, 125 or 200 ml up to 1,000, 1,500 or 2,000 ml even though it will probably be most generally topical with microwave heating of package containers which are not larger than 400 ml It should be understood that the width of the strip will be half of that disclosed above, when the web is cut to blanks in the top-to-top interface. If, on the other hand, it is a top-to-bottom interface, the strip may lie so that its major portion is positioned within the top end of the blank which has its top facing towards the interface.

According to another aspect of the invention, said opening indication is provided as a perforation, preferably by means of laser perforation technology or by means of mechanical perforation technology. If laser perforation technology is employed, it is particularly appropriate to carry out the perforation after the strip has been applied, in which event the strip functions as an arrest means for the laser beams so that the perforation only reaches partly down through the laminate. Preferably, said provision of an opening indication entails the provision of a preferably continuous opening indication on either side of a top-to-top interface, in which event each opening indication is preferably disposed more distal from said top-to-top interface than from one longitudinal edge of the strip, this longitudinal edge being located on the same side of the top-to-top interface as the opening indication in question. If, on the other hand, it is a matter of a top-to-bottom interface, the opening indication will naturally be provided, in the manner just described, only in the top end of that blank whose top is facing towards the top-to-bottom interface. When the laminate is cut to blanks, there will remain an opening indication in the top end of each blank, within the region of the strip. By the positioning of the opening arrangement, it will be ensured that a sufficient amount of strip/metal material is removed in connection with the opening of the packaging container so as not to cause problems on microwave heating.

Different methods of applying said strip to said base laminate are conceivable. In one first embodiment of the present invention, this may be put into effect in that said polymer reinforcing material (if such is present) is oriented directly on the base laminate and heated in connection with the strip and the base laminate being compressed against one another in, for example, the nip between rollers. The heating may, for example, be realised by induction heating, hot air, gas flame, ultrasound etc.

In a second embodiment of the present invention, said strip may be applied to the base laminate in that a polymer lamination material is extruded as a first, elongate layer between said strip and said base laminate, in connection with the strip and the base laminate being compressed against one another in, for example, the nip between rollers. Such a polymer lamination material consists preferably of a polyolefin, for example polypropylene, and may, in one preferred embodiment, consist of hot melt glue. In this context, it is intended that the hot melt glue is "extruded" even if it is pumped to a nozzle instead of, as otherwise, being fed to the nozzle by means of a screw.

According to yet a further aspect of the present invention, the strip is covered, throughout all of its surface and over its lower longitudinal edge, i.e. that longitudinal edge which will run a distance in on the blank, with a polymer covering material, such as polypropylene, polyamide or most preferred a hot melt glue. Such a polymer covering material will function as a thermosealing layer when the top is sealed at the region of the strip, in that the lower longitudinal edge of the strip is covered, the metal foil will not come into contact with the contents in a packaging container formed from the blank and filled with, for example, a food. This application of a covering material may also be put into effect in different manners. According to a first embodiment, the strip is covered after its application to the laminate, or in connection therewith, by a second elongate layer of a polymer covering material, said covering material preferably being applied such that it also covers the longitudinal edges of the strip. In such instance, a polymer lamination material may be extruded as this second elongate layer above said strip and be pressed fast in position, for example in the nip between rollers. According to a second embodiment, there is provided above said polymer reinforcement material, at least on one side of the strip, so that it extends over the longitudinal edges of the strip, the strip being applied at said base laminate so that this polymer reinforcement material is positioned on the opposite side of the metal foil to the base laminate and so that this polymer reinforcement material covers the longitudinal edge of the strip.

A sealing region for the bottom transverse sealing may, in the embodiment where the first-mentioned strip is provided over a top-to-top interface, for example be realised in that a second continuous strip of a material which conducts heat and electricity is applied in the machine direction, in a second region at a bottom end of the blanks, this second strip being preferably narrower than the first said strip, e.g. about 5-10 mm (per blank). Other aspects for this second strip may be those which are applicable of those described above for the first mentioned strip, for the top seal. However, it is also conceivable to realise the bottom sealing in a completely different method, for example by ultrasound, impulse heating, hot air etc.

The base laminate which, according to the invention, is provided with the strip of a material which conducts heat and electricity may have a structure which may vary within broad limits. However, a fundamental concept may be said to be that the base laminate, seen from the intended outside of the laminate and towards its inside provided with the strip, comprises a liquid-tight sealing layer, a core or bulk layer of preferably paper or paperboard, a gas barrier layer and a liquid-tight coating layer, as well as possible interjacent tie layers. One advantage deriving from the present invention is that the liquid-tight coating layer on the inside of the laminate may be made thinner than is otherwise the case, since it need not be adapted for transverse seals, but only for the less demanding longitudinal seals.

According to a final aspect of the method according to the present invention, said blank of packaging laminate is foldformed, after step (b), into a packaging container which is filled with a food, sealed and retorted. In such instance, the transverse seals are preferably put into effect by induction heating. Where applicable, retorting may be dispensed with or replaced by hot fill.

The present invention also relates to a blank of thermosealable and creased packaging laminate for a microwavefriendly packaging container, the blank of packaging laminate having a top end provided with an elongate opening indication, a continuous strip of a material which conducts heat and electricity being provided on the one side of the packaging laminate and adjacent said top end, so that it covers said opening indication.

The present invention further relates to a microwavefriendly and preferably retortable or hot fillable packaging container which is fold formed, filled and sealed from such a blank.

BRIEF DESCRIPTION OF THE ACCOMPANYING DRAWINGS

The present invention will now be described in greater detail hereinbelow, with reference to one preferred embodiment and with reference to the accompanying Drawings. In the accompanying Drawings.

DETAILED DESCRIPTION OF ACCOMPANYING DRAWINGS AND PREFERRED EMBODIMENTS

It should be observed that the present invention is not restricted to the specifically preferred embodiments which are shown in the Drawing Figures and that numerous alterations and modifications will be obvious to the skilled reader of this specification without departing from the inventive concept as this is defined in the appended claims.

Figure 1:
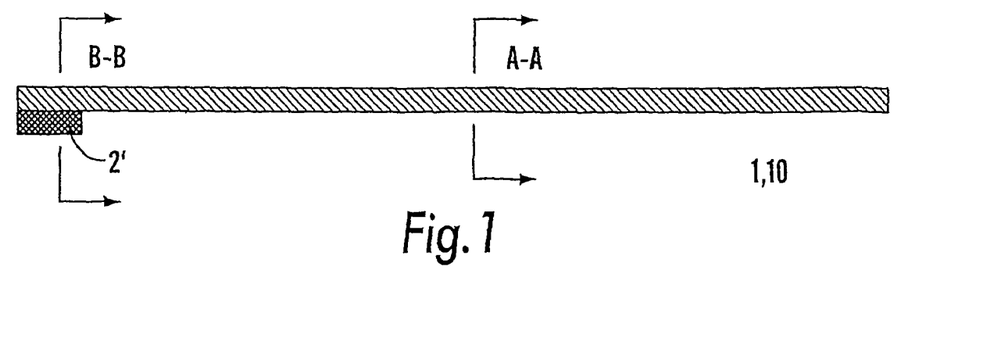
FIG. 1 schematically illustrates a part of a web of continuous blanks of packaging laminate according to the present invention, including applied strips, seen transversely of the web.

FIG. 1 thus shows a part of a web 1 of continuous blanks of packaging laminate according to the invention, including applied, encapsulated strips 2', seen transversely of the web.

Figure 2:
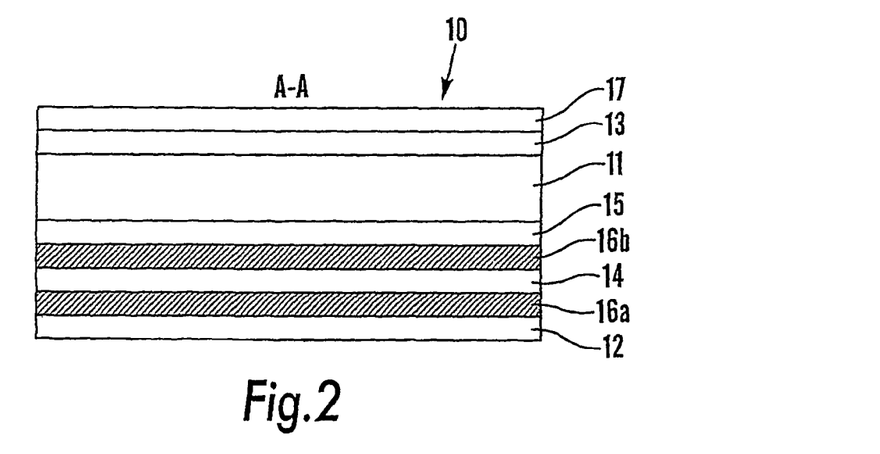
FIG. 2 schematically shows a cross section taken along the section line A-A of the web in FIG. 1, in a position without strip.

FIG. 2 shows that the base laminate carrying the generic reference numeral 10 has a core or bulk layer 11 and outer, liquid-tight and thermosealable coatings 12 and 13 on both sides of the core layer 11. The base laminate 10 further displays a gas barrier 14 between the core layer 11 and the one liquid-tight coating 12 and moreover, an additional liquid-tight interjacent layer 15 may be disposed between the core layer 11 and the gas barrier 14.

Tie layers 16a, 16b of suitable adhesive may be provided at requisite places between the just-described layers. In FIG. 2, one such tie layer 16a is shown between the liquid-tight coating 12 and the gas barrier 14, and also one tie layer 16b between the gas barrier 14 and the additional, liquid-tight interjacent layer 15.

The outer, liquid-tight coating 13 on the other side of the core layer 11 may display decorative artwork in a suitable printing ink which in turn is protected by a transparent layer 17, applied on the decorative artwork and consisting of a suitable lacquer or other agent so as to protect the decorative artwork from external action. It is also conceivable that the decorative artwork and the protective lacquer be applied only once the strips 2 have been applied.

The core layer 11 may consist of any suitable rigid, but foldable material whatever, but preferably consists of paper or paperboard of conventional packaging quality.

The outer, liquid-tight coating 13 may be a plastic which is selected from the group essentially comprising any quality of polyethylene (PE), polypropylene (PP) and polyester (PET), or mixtures thereof. The thickness or quantity of the outer, liquid-tight coating 13 may vary, but in general lies in the order of magnitude of between 25 and 45 g/m².

Correspondingly, the liquid-tight coating 12 may consist of a plastic which is selected from the group essentially comprising any quality of polyethylene (PE), polypropylene (PP), polyester (PET) and copolymers thereof. The thickness or quantity of the plastic coating 12 may vary, but in general is in the order of magnitude of between 25 and 35 g/m² The gas barrier layer 14 is formed from a material which does not conduct heat and electricity, for example polyethylene terephthalate (PET), amorphous polyethylene terephthalate (APET), cyclic olefin copolymers (COC), polyamide (PA), amorphous polyamide (APA), liquid crystalline polymers (LCP), ethylene vinyl alcohol copolymers (EVOH) and polyvinyl alcohol (PVOH) ethyl vinyl alcohol. Possibly, these materials may be combined with layers of SiOx or AlOx.

Suitable adhesives or binders for the tie layer/tie layers 16a, 16b for use in the base laminate 10 are per se known in the art, but, a particularly preferred binder according to the invention is that which may be obtained from Mitsui, Japan, under the trade name Admer (adhesion plastic).

Figure 3:
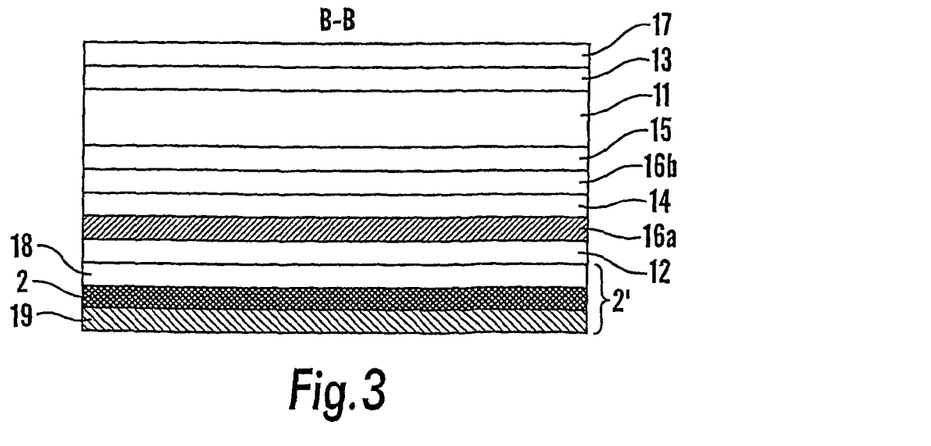
FIG. 3 schematically shows a cross section taken along the section line B-B of the web in FIG. 1, in a position with a strip.

In FIG. 3, the base laminate 11, 12, 13, 14, 15, 16a, 16b, 17 is the same as in FIG. 2, but an encapsulated strip 2' is disposed on its inside (see FIG. 1). The encapsulated strip 2' includes the strip 2 proper which is formed from a foil of a material which conducts heat and electricity, preferably a metal foil and even more preferably an aluminium foil. The strip 2 has been caused to adhere to the liquid-tight coating 12 by means of a layer 18 of polymer material. Outermost, i.e. outside the strip, a layer 19 of polymer thermosealable material is disposed.

Figure 4:
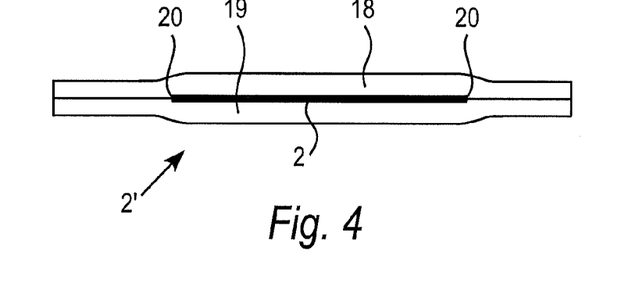
FIG. 4 is a cross section of a strip of a material which conducts heat and electricity, with reinforcing material on both sides thereof.

FIG. 4 shows one example of an encapsulated strip 2' in cross section. Here, the layers 18 and 19 have been applied as reinforcing layers on the strip 2 already before the strip is applied on the base laminate. In the illustrated embodiment, both layers 18 and 19 extend a short distance outside the longitudinal edges 20 of the strip 2 so that its longitudinal edges are protected from contact with the food product which is to be filled in the packaging container formed from the blank with the strip. Outside the longitudinal edges 20 of the strip 2, the layers 18 and 19 are sealed to one another. However, it is also conceivable that it is only the layer 19 which extends substantially outside the longitudinal edges 20 of the strip 2.

Figure 5:
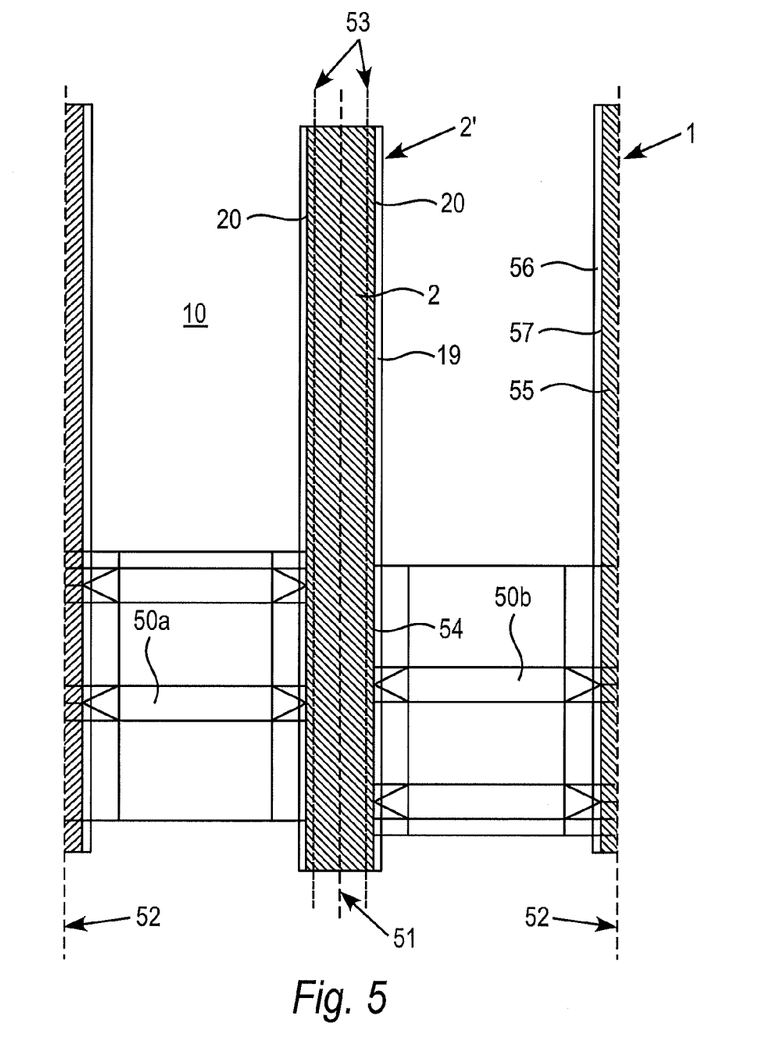
FIG. 5 shows a web of continuous blanks of packaging laminate according to the invention, including applied strips and seen from above.

FIG. 5 shows a web of continuous blanks 50a, 50b according to the present invention consisting of packaging laminate, including applied strips and seen from above. For illustrative purposes, there is shown in the lower part of the Figure the appearance of the web after creasing, while the upper part of the Figure shows the appearance of the web before creasing. The broken line 51 constitutes the top-to-top interface for the blanks 50, i.e. that the blanks 50a which lie in file with one another along the machine direction of the web 1 in this top-to-top interface 51 with the tops of these blanks 50a lying directly adjacent the top of the blanks 50b which also lie in file with one another along the machine direction of the web 1. Thus, the blanks 50a and 50b are oriented with their top-to-bottom direction transversely of the machine direction in parallel files where the blanks meet top-to-top in the interface 51. Suitably, the number of files in the web 1 is equally divisible by two and if there are more than two files, the bottoms of the blanks also meet bottom-to-bottom in a second interface 52. The interfaces 51 and 52 also constitute cutting lines in which the continuous blanks will be cut from one another.

The top-to-top interface 51 is covered by a continuous strip 2 according to the invention, the strip extending over a continuous opening indication 53, preferably a perforation, on either side of the top-to-top interface 51. It should be understood that the opening indication 53 may be provided before or after the strip 2 has been applied to the web 1. The strip 2 also extends over a top fin crease 54 in the blanks 50a, 50b. The strip is covered by a protective layer of polymer material 19 which extends out over the longitudinal edges 20 of the strip 2.

In the illustrated embodiment, a second continuous strip 55 of a material which conducts heat and electricity is disposed in the machine direction, at a bottom end of the blanks 50a, 50b. This second strip 55 is narrower than the first-mentioned strip 2. The second strip 55 is also covered by a protective layer of polymer material 56 which extends out over the longitudinal edges 57 of the strip 55.

The regions of the strips 2 and 55 will constitute the sealing regions for transverse seals when the blanks 50a, 50b are formed, filled and sealed so as to form packaging containers.

Figure 6:
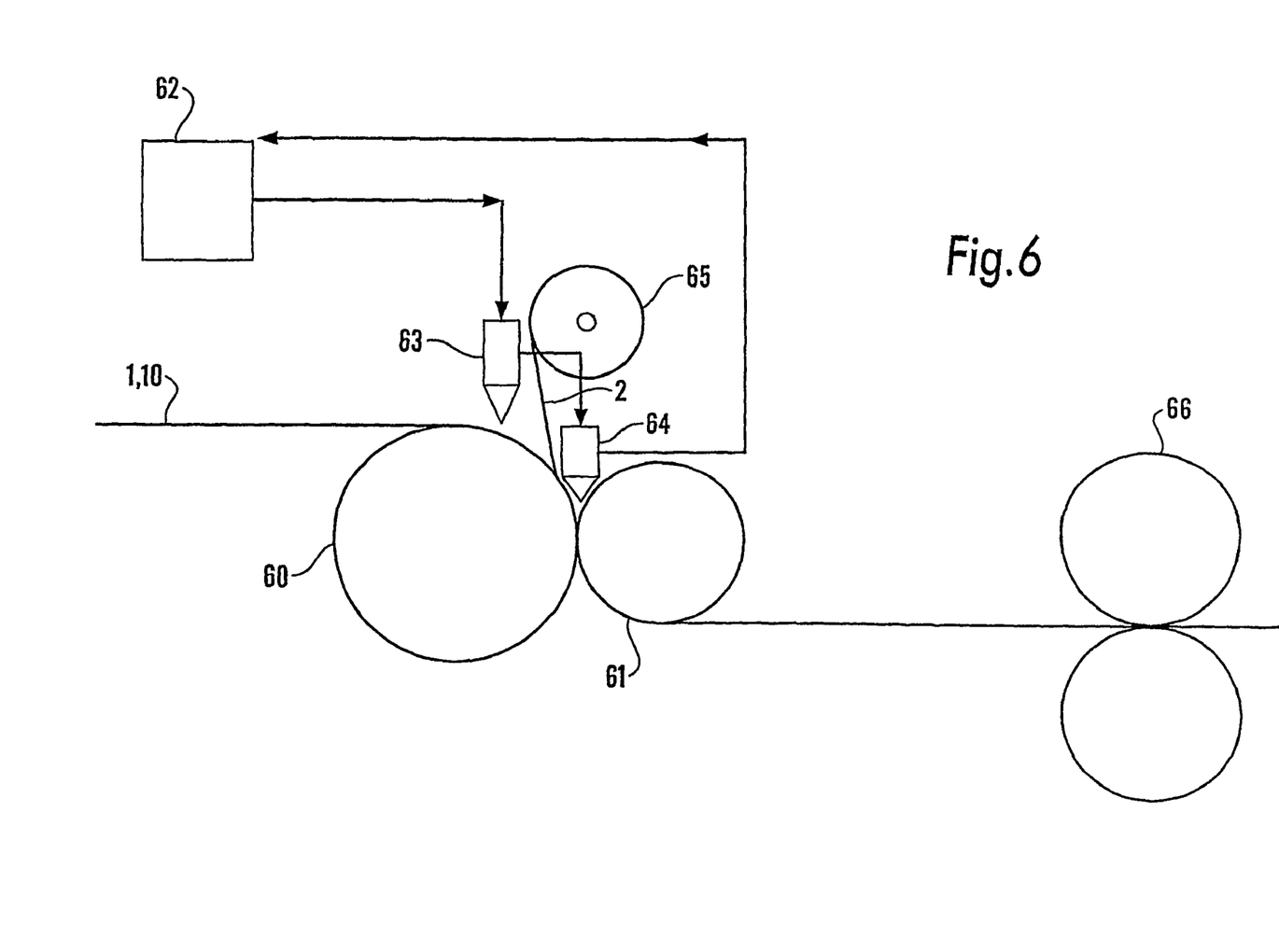
FIG. 6 schematically shows one preferred process for applying the strip to the web, seen from the side.

FIG. 6 schematically illustrates one preferred process for applying the strip 2 to the web 1, seen from the side. The web 1, consisting of base laminate 10, is advanced to a nip between a cooling roller 60 and a press roller 61. A hot melt glue pump 62 delivers hot melt glue to a first hot melt glue nozzle 63 and a second hot melt glue nozzle 64. The strip 2 is delivered from a magazine stand 65. The first hot melt glue nozzle 63 applies a strand of hot melt glue between the web 1 and the strip 2, and the second hot melt glue nozzle 64 applies a wider strand of hot melt glue over the strip 2 and its longitudinal edges. The whole is permanently united in the subsequent nip between the rollers. The web 1 with the applied strip departs from the nip and is advanced further to equipment 66 for creasing and cutting into individual blanks. It should be understood that additional processing steps may occur between the nip of the rollers and the equipment for creasing and cutting, such as the provision of opening indication and/or decorative artwork printing and application of protective lacquer, unless these additional steps are carried out in another position. However, it is to be preferred that the web material with the strips does not need to be rolled up before being cut into blanks, since the strips may give an undesirable build-up of material in corresponding positions on the reel.

Figure 7:
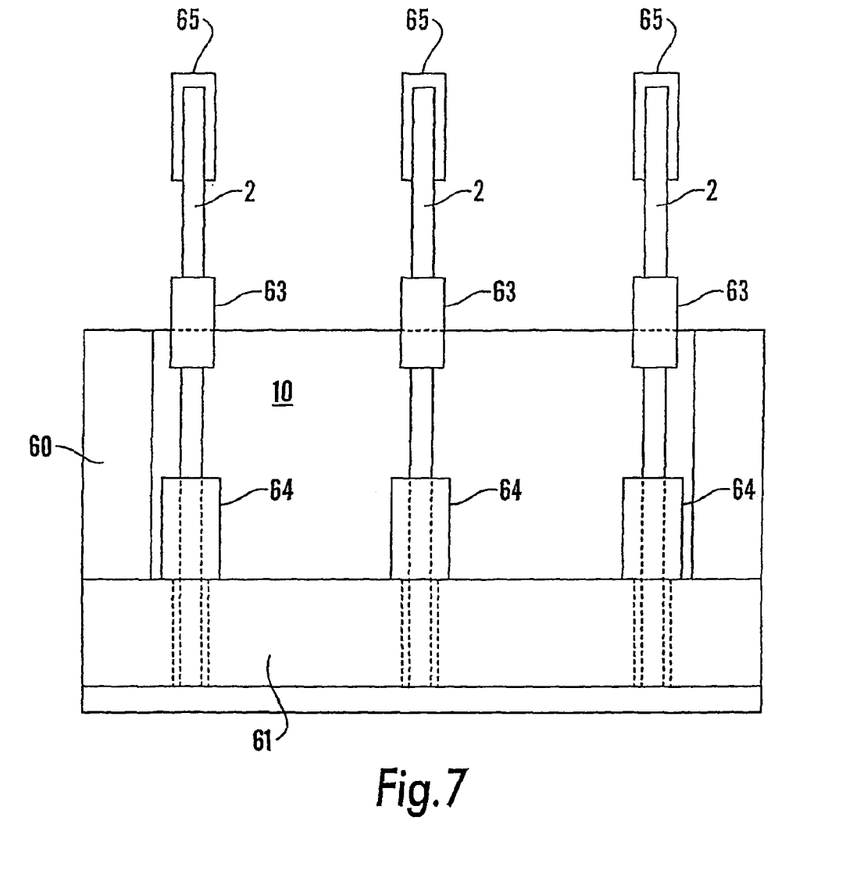
FIG. 7 shows the process according to FIG. 6, seen from above.

FIG. 7 shows the process according to FIG. 6 seen from above. Here, it can be seen how three strips 2 are applied across the width of the web 1.

Figure 8:
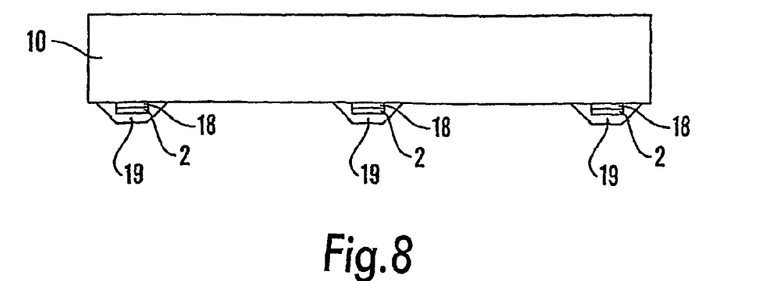
FIG. 8 schematically shows in cross section the material resulting from the process illustrated in FIGS. 6 and 7.

FIG. 8 schematically shows in cross section the web material resulting from the processes in FIGS. 6 and 7 and consisting of base laminate 10, strips 2 and polymer material 18, 19 encapsulating the strips 2.

The present invention is not restricted to the described embodiments, but may be varied without departing from the scope of the appended claims. In particular, it should be perceived that the layer structure for the base laminate may be varied within broad limits, that disclosed in the foregoing merely constituting examples of conceivable embodiments.

What is claimed is:

1. A blank of thermosealable and creased packaging laminate for a microwave-friendly packaging container, said blank of packaging laminate having a top end provided with an elongate opening indication comprising a perforation extending along the top end in a widthwise direction of the blank, and a continuous strip of a material which conducts heat and electricity disposed on one side of the packaging laminate and adjacent said top end so that it covers said opening indication, wherein the perforation extends across the entire width of the blank.

2. The blank as claimed in claim 1, wherein said strip is formed from a metal foil, said metal foil displaying a thickness of between 6 and 20 μm and a width of between 10 and 25 mm.

3. The blank as claimed in claim 1, wherein said strip also covers a top fin crease in proximity of said top end.

4. The blank as claimed in claim 1, wherein said opening indication is disposed more distally from said top end than from a lower longitudinal edge of the strip.

5. The blank as claimed in claim 1, wherein a first elongate layer of polymer material is disposed between said strip and a remainder of the packaging laminate, said first elongate layer being as wide as the strip and interconnecting the strip and the packaging laminate to one another.

6. The blank as claimed in claim 5, wherein a second elongate layer of polymer material covers said strip.

7. The blank as claimed in claim 1, wherein a second continuous strip of a material which conducts heat and electricity is disposed at a bottom end of said blank, said second strip being narrower than said first strip.

8. The blank as claimed in claim 1, wherein said packaging laminate displays a structure which, seen from an intended outside of the laminate and towards its inside provided with the strip, comprises a liquid-tight sealing layer, a core layer of paper or paperboard, a gas barrier layer and a liquid-tight coating layer.

9. A microwave-friendly and retortable or hot fillable packaging container that is fold formed, filled and sealed from a blank as claimed in claim 1.

10. The blank as claimed in claim 1, wherein said packaging laminate displays a structure which, seen from an intended outside of the laminate and towards its inside provided with the strip, comprises a liquid-tight sealing layer, a core layer of paper or paperboard, a gas barrier layer, a liquid-tight coating layer, and interjacent tie layers.

11. The blank as claimed in claim 6, wherein the second elongate layer of polymer material extends out over a lower longitudinal edge of the strip.

12. A blank of thermosealable and creased packaging laminate for a microwave-friendly packaging container, said blank of packaging laminate having a top end provided with an elongate opening indication comprising a perforation extending along the top end in a widthwise direction of the blank, and a continuous strip of a material which conducts heat and electricity disposed on one side of the packaging laminate and adjacent said top end so that it covers said opening indication, wherein the strip of conductive material extends across the entire width of the blank.

13. The blank as claimed in claim 12, wherein said strip is formed from a metal foil, said metal foil displaying a thickness of between 6 and 20 μm and a width of between 10 and 25 mm.

14. The blank as claimed in claim 12, wherein said strip also covers a top fin crease in proximity of said top end.

15. The blank as claimed in claim 12, wherein said opening indication is disposed more distally from said top end than from a lower longitudinal edge of the strip.

16. The blank as claimed in claim 12, wherein a first elongate layer of polymer material is disposed between said strip and a remainder of the packaging laminate, said first elongate layer being as wide as the strip and interconnecting the strip and the packaging laminate to one another.

17. The blank as claimed in claim 16, wherein a second elongate layer of polymer material covers said strip.

18. The blank as claimed in claim 17, wherein the second elongate layer of polymer material extends out over a lower longitudinal edge of the strip.

19. The blank as claimed in claim 12, wherein a second continuous strip of a material which conducts heat and electricity is disposed at a bottom end of said blank, said second strip being narrower than said first strip.

20. A blank of thermosealable and creased packaging laminate for a microwave-friendly packaging container, said blank of packaging laminate having a top end provided with an elongate opening indication comprising a perforation extending along the top end in a widthwise direction of the blank, and a continuous strip of a material which conducts heat and electricity disposed on one side of the packaging laminate and adjacent said top end so that it covers said opening indication, wherein both the perforation and the strip of conductive material extend across the entire width of the blank.

* * * * *